US010144534B2

(12) United States Patent
Mena (10) Patent No.: US 10,144,534 B2
(45) Date of Patent: Dec. 4, 2018

(54) SPACECRAFT (71) Applicant: AIRBUS DEFENCE AND SPACE SAS, Les Mureaux (FR)

(72) Inventor: Fabrice Mena, Teulat (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 0 days.

(21) Appl. No.: 15/534,710

(22) PCT Filed: Dec. 15, 2015

(86) PCT No.: PCT/FR2015/053504
§ 371 (c)(1),
(2) Date: Jun. 9, 2017

(87) PCT Pub. No.: WO2016/097577
PCT Pub. Date: Jun. 23, 2016

(65) Prior Publication Data
US 2018/0265226 A1 Sep. 20, 2018

(30) Foreign Application Priority Data
Dec. 18, 2014 (FR) .................................... 14 62687

(51) Int. Cl.
*B64G 1/50* (2006.01)
(52) U.S. Cl.
CPC ............ *B64G 1/503* (2013.01); *B64G 1/506* (2013.01)
(58) Field of Classification Search
CPC .................................. B64G 1/503; B64G 1/506
See application file for complete search history.

(56) References Cited

U.S. PATENT DOCUMENTS

| 3,402,761 A * | 9/1968 | Swet | B64G 1/506 165/104.26 |
| 3,489,203 A * | 1/1970 | Fischell | B64G 1/506 165/104.26 |
| 4,162,701 A * | 7/1979 | Ollendorf | B64G 1/50 165/104.11 |

(Continued)

FOREIGN PATENT DOCUMENTS

EP 006 769 A2 6/2000

OTHER PUBLICATIONS

International Search Report, dated Mar. 8, 2016, from corresponding PCT/FR2015/053504 application.

*Primary Examiner* — Christopher P Ellis
(74) *Attorney, Agent, or Firm* — Young & Thompson (57) ABSTRACT

Disclosed is a spacecraft including:—a housing defining an inner space and an outer space, the housing having a first surface and a second surface opposite the first surface; a first radiator and a second radiator supported by the first surface and the second surface, respectively, the first radiator and the second radiator each having a main inner surface, a main outer surface opposite the main inner surface and side surfaces. The spacecraft further includes a first auxiliary radiator and a first auxiliary heat-transfer device thermally connecting the first auxiliary radiator to the main inner surface of the second radiator, the first auxiliary radiator being arranged in a first portion of the outer space, the first portion being defined by the main outer surface of the first radiator and by the first planes containing the side surfaces of the first radiator.

20 Claims, 10 Drawing Sheets (56) References Cited

U.S. PATENT DOCUMENTS

| | | | | |
|---|---|---|---|---|
| 5,332,030 | A | 7/1994 | Spencer et al. | |
| 5,806,803 | A * | 9/1998 | Watts | B64G 1/503 |
| | | | | 165/41 |
| 5,954,298 | A * | 9/1999 | Basuthakur | B64G 1/402 |
| | | | | 165/41 |
| 6,478,258 | B1 * | 11/2002 | Yee | B64G 1/503 |
| | | | | 165/41 |
| 6,776,220 | B1 | 8/2004 | Low et al. | |
| 6,923,249 | B1 * | 8/2005 | Porter | B64G 1/425 |
| | | | | 136/246 |
| 7,967,256 | B2 * | 6/2011 | Wong | B64G 1/425 |
| | | | | 244/171.8 |
| 9,828,116 | B1 * | 11/2017 | Mena | B64G 1/50 |
| 2004/0188568 | A1 * | 9/2004 | Gayrard | B64G 1/506 |
| | | | | 244/171.8 |
| 2004/0232284 | A1 * | 11/2004 | Tjiptahardja | B64G 1/503 |
| | | | | 244/171.8 |
| 2010/0001141 | A1 * | 1/2010 | Jondeau | B64G 1/50 |
| | | | | 244/158.1 |
| 2010/0243817 | A1 * | 9/2010 | McKinnon | B64G 1/50 |
| | | | | 244/171.8 |
| 2015/0069187 | A1 * | 3/2015 | McKinnon | B64G 1/50 |
| | | | | 244/171.8 |
| 2016/0288926 | A1 * | 10/2016 | Smith | B64G 1/503 |
| 2017/0361951 | A1 * | 12/2017 | Walker | B64G 1/402 |

* cited by examiner

SPACECRAFT

This invention relates to a spacecraft and in particular a geostationary satellite.

Figure 1:
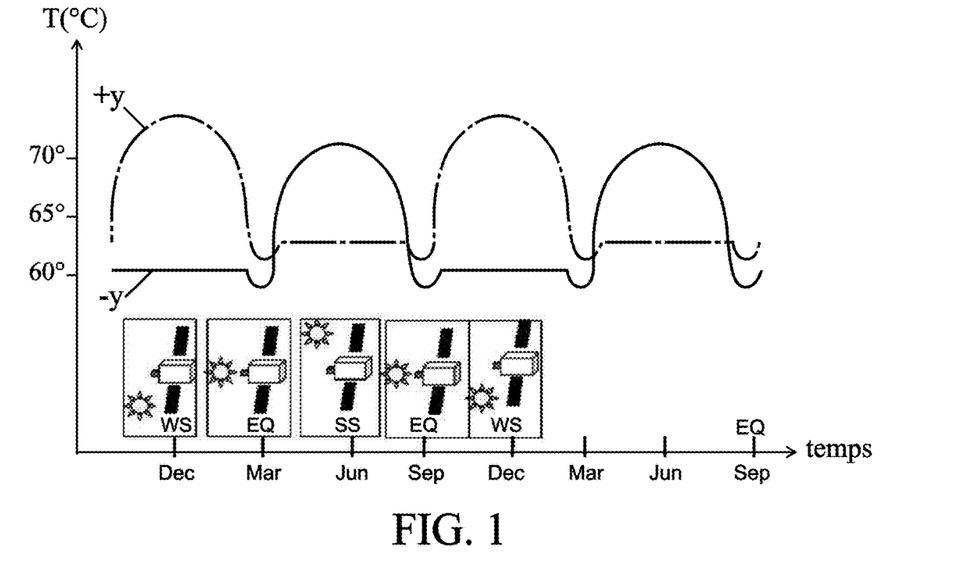
FIG. 1 are two curves that represent variations in temperature of the surfaces +Y and −Y of a spacecraft according to prior art over the course of a year.

Due to the movement of revolution of the Earth around the sun, the various surfaces of a geostationary satellite do not receive the same quantity of solar radiation during the seasons. This results in substantial difference in temperature between the surfaces +Y and −Y of the satellite as well as cyclical variations in these temperatures during the seasons. As such, as can be seen in FIG. 1, during the winter solstice (WS), the surface +Y, exposed to solar radiation, has temperatures that are higher than the surface −Y located in the shade. During the summer solstice (SS), it is the surface −Y that has high temperatures because it is exposed to solar radiation while the surface +Y is in the shade. During the winter and summer equinoxes (EQ), the surfaces −Y and +Y have temperatures that are lower than during the winter (WS) and summer (SS) solstices.

These differences in temperature between the surface +Y and the surface −Y as well as the fluctuations in temperature during the seasons, are restrictive for the satellite and for its payload.

In order to reduce these differences in temperature, various palliative systems have already been set in place. However, these palliative systems are not entirely satisfactory.

U.S. Pat. No. 6,776,220 discloses for example heat pipes arranged between the radiator fixed on the surface +Y and the radiator fixed on the surface −Y. These heat pipes make it possible to transfer a fraction of the excess heat from a radiator located on the side of the sun to a radiator located in the shade. However, despite the presence of these heat pipes, the differences in temperature between the surface +Y and the surface −Y remain substantial especially during summer and winter solstices during which they can still reach about 10° C. to 15° C., since the radiator located in the shade is already highly solicited by the dissipations of the electronic equipment that it cools. The radiator located in the shade can therefore receive only a low quantity of excess heat from the radiator located in the sun.

Contrary to U.S. Pat. No. 6,776,220, this invention calls upon an auxiliary radiator that is not in direct thermal exchange with electronic equipment. This auxiliary radiator is in addition located in the shade when the radiator of the opposite wall is located on the side of the sun. The auxiliary radiator according to this invention can as such receive a large quantity of heat from the radiator located in the sun in such a way as to lower differences in temperature between the walls +Y and −Y.

Finally, this heat balance is obtained with the installation of a thermal energy transport system such as LHP or MPL which, contrary to U.S. Pat. No. 6,776,220, requires only the installation of two pipes between the two radiators, instead of a certain relatively high number of heat pipes of which the total mass is substantial.

Electrical warmers have also been used to heat the surfaces of the satellite located on the shade side. However, warmers have limited effectiveness and require over-sizing the electrical power system of the satellite. This over-sizing substantially increases the cost of the electrical power system. In addition, the heating of the cold portions of the satellite also cause an increase in the temperature of the hot portions of the latter. However, these hot portions are already close to their operating temperature limit.

Moreover, these differences in temperatures between the surfaces of the satellite have to be reproduced during qualification tests of the satellite. Implementing these thermal differences and their quarterly fluctuation in a vacuum atmosphere is complex.

The purpose of this invention is to limit the differences in temperature between the surfaces +Y and −Y and to reduce, for the same surface, the variations in temperature during the seasons.

To this effect, the invention has for object a spacecraft comprising:
  a housing defining an inner space and an outer space, the housing having a first surface and a second surface opposite the first surface,
  a first radiator and a second radiator supported by the first surface and the second surface, respectively, the first radiator and the second radiator each comprising a main inner surface, a main outer surface opposite the main inner surface and side surfaces,
  characterised in that the spacecraft further comprises a first auxiliary radiator and a first auxiliary heat-transfer device thermally connecting said first auxiliary radiator to the main inner surface of the second radiator, the first auxiliary radiator being arranged in a first portion of the outer space, said first portion being defined by the main outer surface of the first radiator and by the first planes containing the side surfaces of the first radiator.

Advantageously, the first heat-transfer device and first auxiliary radiator unit make it possible to cool the second radiator when the latter is exposed to solar radiation, i.e. during winter solstices and summer solstices. The cooling of the second radiator allows for a more effective cooling of the electronic equipment.

Advantageously, the decrease in the variations in temperature of the surfaces of the spacecraft should make it possible to reduce the duration of the qualification tests in a thermal vacuum. This would result in a significant gain in terms of cost and the design duration of a spacecraft.

Advantageously, the first auxiliary heat-transfer device and first auxiliary radiator unit can be easily mounted and dismounted on a spacecraft during the design or be added to an already existing spacecraft. Adding this unit does not require modifying the architecture of the already existing spacecraft.

Advantageously, the first heat-transfer device and first auxiliary radiator unit has a low encumbrance. This unit makes it possible to increase the thermal rejection capacity of the spacecraft without increasing the size of the first and second radiators.

Advantageously, the first heat-transfer device and first auxiliary radiator unit has a low mass and cost.

According to particular embodiments, the spacecraft comprises one or several of the following characteristics:
  said first auxiliary radiator is thermally insulated from the first radiator;
  the spacecraft comprises a second auxiliary radiator and a second auxiliary heat-transfer device thermally connecting said second auxiliary radiator to the main inner surface of the first radiator; said second auxiliary radiator being arranged in a second portion of the outer space defined by the main outer surface of the second radiator and by second planes containing the side surfaces of the second radiator, and wherein the first auxiliary heat-transfer device and the second auxiliary heat-transfer device are reversible.

Advantageously, using a second auxiliary radiator and two reversible heat-transfer devices furthermore makes it possible to heat the first surface of the spacecraft, when the second surface is exposed to solar radiation. As such, the first surface is subjected to variations in temperature that are not as substantial between the winter solstice and the summer solstice.

at least one from the first auxiliary radiator and the second auxiliary radiator, is covered with a relatively high solar absorption coefficient and a high infrared emissivity, for example black paint.

the one at least from the first auxiliary radiator and the second auxiliary radiator comprises at least one main radiative surface that extends according to a direction perpendicular to the main outer surface of the first radiator.

Such an arrangement makes it possible to increase the overall radiative surface of the spacecraft. This arrangement reduces only somewhat the radiative surface and the effectiveness of the first and second radiators.

the first auxiliary radiator comprises at least two plates that cross.

This embodiment makes it possible to reduce the radiative surface of the second radiator obscured by the first auxiliary radiator. This embodiment makes it possible to always offer the same surface exposed to the sun when the sun rotates around the auxiliary radiator during the course of a day.

the first auxiliary radiator has the general shape of a cylindrical section open at each one of its ends.

the first auxiliary radiator (has the general shape of a parallelepiped open at each one of its ends.

When the first and second auxiliary heat-transfer devices are reversible, the arrangements described hereinabove make it possible to have all throughout the day at least one portion of the auxiliary radiator exposed to the sun. As such, the variations in solar radiation linked to the orbital movement are offset during the course of a twenty-four-hour period.

the first heat-transfer device is not reversible.

the first auxiliary radiator is made from a flexible material.

the first auxiliary radiator is made from graphoil.

The invention shall be better understood when reading the following description, given solely by way of example and given in reference to the drawings, wherein.

In the various figures, the same references designate identical or similar elements.

Figure 2:
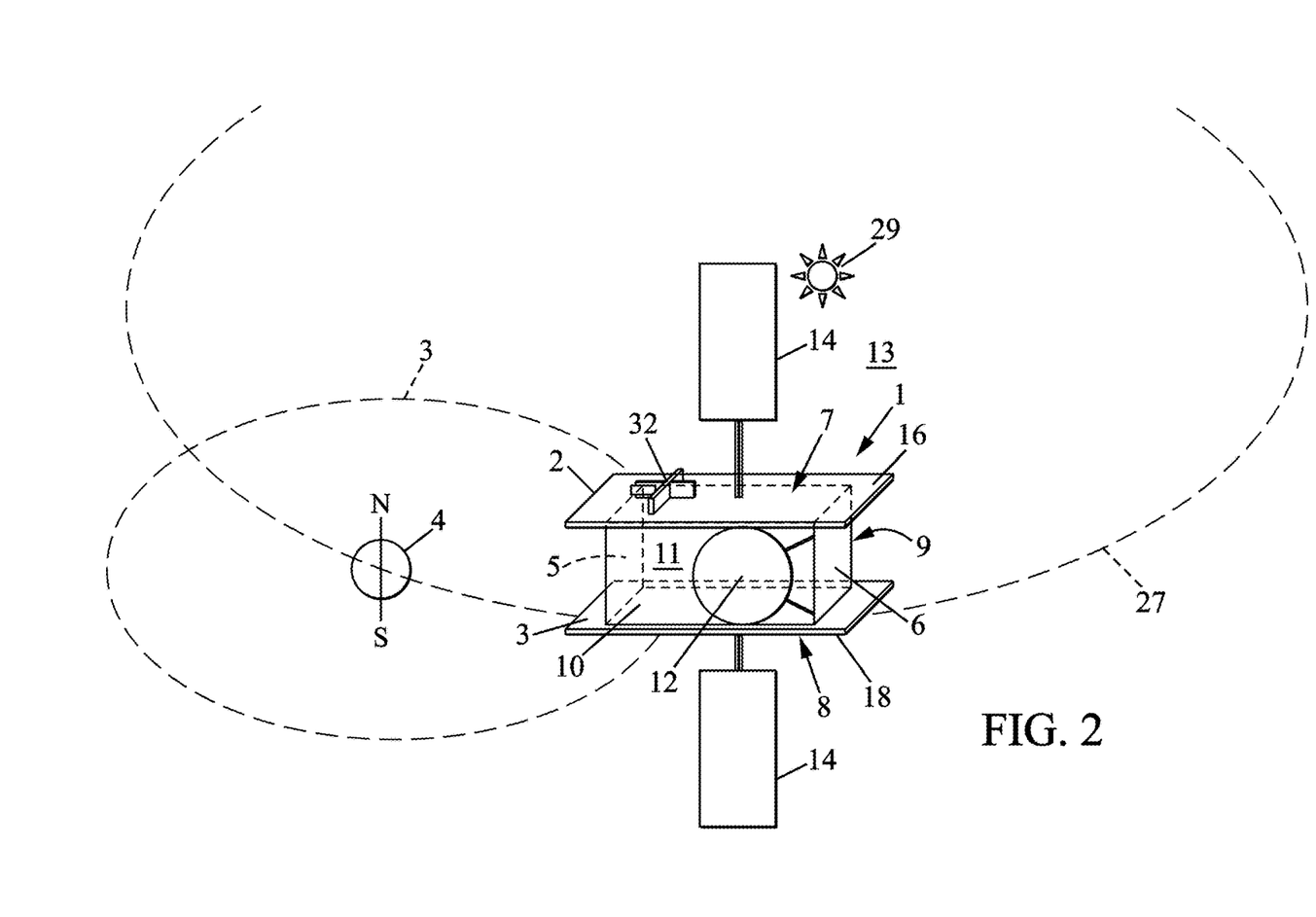
FIG. 2 is a diagrammatical view of the spacecraft according to the invention in geostationary orbit.

In reference to FIG. 2, a spacecraft 1 of the geostationary satellite type is able to rotate on an orbit 3 around the Earth 4, with the Earth 4 rotating itself on an orbit 27 around the Sun 29.

The spacecraft 1 has the shape of a parallelepiped housing 2 defining an inner space 11 and an outer space 13. This housing 2 always has the same surface directed towards the Earth, this surface being called the Earth surface 5. The surface opposite and parallel to the Earth surface 5 is called the anti-Earth surface 6.

The surface −X, also called East surface 9, and the surface +X, also called West surface 10, are opposite surfaces, parallel to one another and perpendicular to the direction of displacement of the spacecraft 1. Communication antennas 12 are generally fixed on the surfaces −X 9 and +X 10.

The surface −Y, also called North surface 7, and the surface +Y, also called South surface 8, are two other surfaces of the housing. They are opposite, parallel between them and perpendicular to the North-South axis of the Earth 4. For the purposes of simplifying the description, the surfaces −Y and +Y shall be designated in what follows by the terms first surface 7 and respectively second surface 8.

Solar panels 14 are fixed onto the first 7 and second 8 surfaces. Finally, a first main radiator 16, generally called North radiator, is fixed and extends over the first surface 7. A second main radiator 18, generally called South radiator, is fixed to and extends over the second surface 8.

Figure 3:
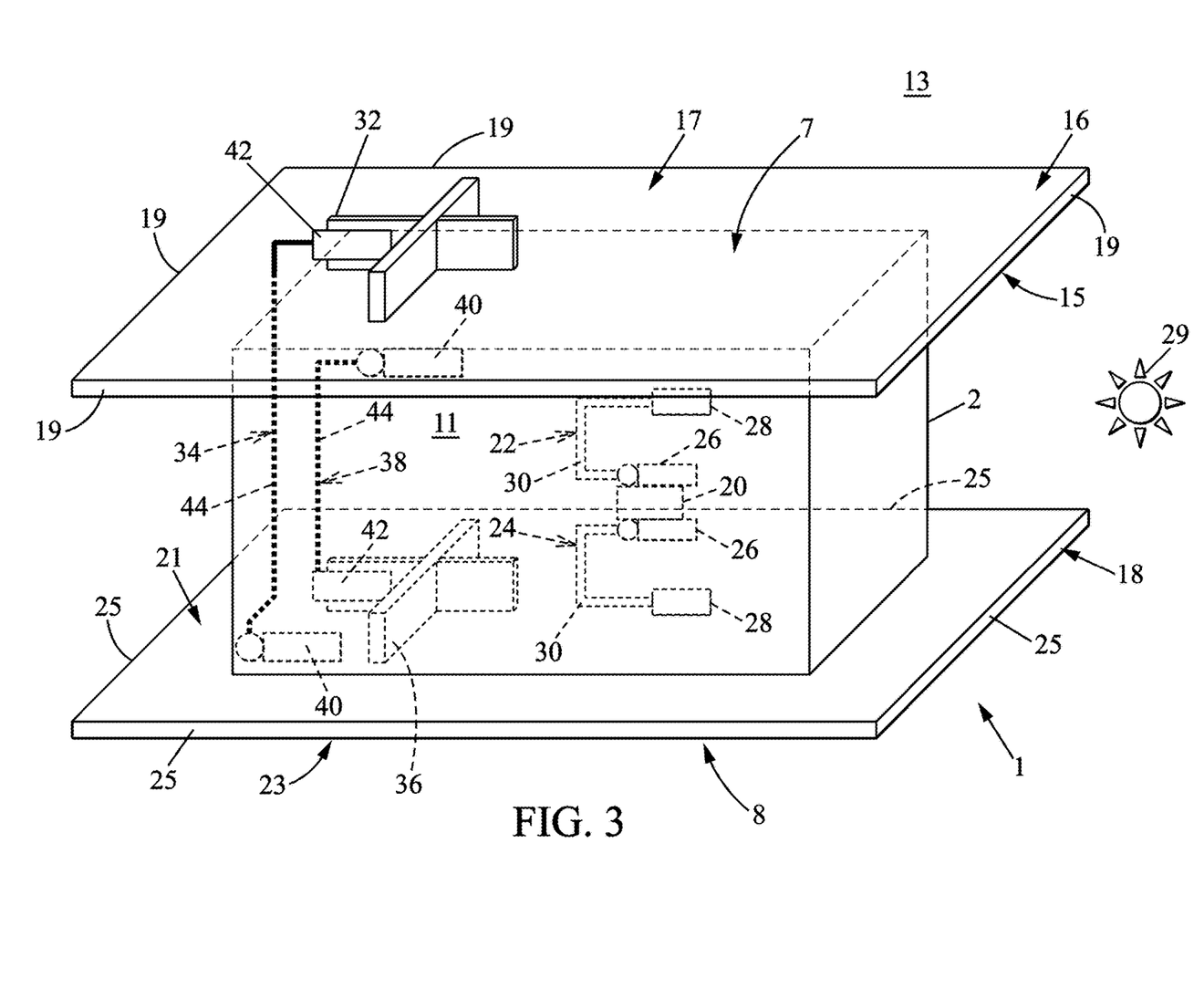
FIG. 3 is a perspective diagrammatical view of a first embodiment of the spacecraft according to the invention, during the equinox.

In reference to FIG. 3, the first 16 and the second 18 radiators have a general parallelepiped shape. They each have four side surfaces 19, 25, a main inner surface 15, 21 fixed to the housing 2, a main outer surface 17, 23 opposite the main inner surface and located on the side of the outer space 13.

The spacecraft 1 transports electronic equipment 20 as well as a first 22 and a second 24 main heat-transfer devices able to cool the electronic equipment 20. The electronic equipment conventionally includes radiofrequency equipment, electronic equipment, measuring instruments, calculating units and batteries. The first main heat-transfer device 22 thermally connects the electronic equipment 20 to the first radiator 16. The second main heat-transfer device 24 thermally connects the electronic equipment 20 to the second radiator 18.

Conventionally, the first 22 and second 24 main heat-transfer devices each comprise a loop heat pipe 26 in thermal contact with electronic equipment 20, a condenser 28 in thermal contact with the first radiator 16 and respectively the second radiator 18, and ducts 30 for transporting a heat transfer fluid connecting the loop heat pipe 26 to the condenser 28. By convention, loop heat pipes are diagrammed in the figures by a circle and rectangle unit and the condensers by a rectangle. These main heat-transfer devices 22 and 24 can conventionally be heat pipes or capillary fluid loops wherein the fluid reservoir is integrated into the evaporator (Loop Heat Pipe).

According to the invention, the spacecraft 1 further comprises a first auxiliary radiator 32 fixed to the first radiator 16, a first auxiliary heat-transfer device 34 able to transfer heat from the first auxiliary radiator 32 to the inner surface 21 of the second radiator, a second auxiliary radiator 36 fixed to the second radiator 18, and a second auxiliary heat-transfer device 38 able to transfer heat from the second auxiliary radiator 36 to the inner surface 15 of the first radiator.

The first 34 and the second 38 auxiliary heat-transfer devices are identical. They are not reversible, i.e. they are mono-directional. They each comprise a loop heat pipe 40, a condenser 42 and pipes 44 (thermally connecting the loop heat pipe 40 to the condenser 42. Preferentially, it will be a capillary driven loop (CDL and in particular a capillary fluid loop wherein the fluid reservoir is integrated into the evaporator (Loop Heat Pipe). These devices are well known to those skilled in the art. Reference will be made in particular to standard ECSS-E-ST-31-02C of Dec. 12, 2012.

The loop heat pipe 40 of the first auxiliary heat-transfer device is in thermal contact with the main inner surface 21 of the second radiator 18. The loop heat pipe 40 of the second auxiliary heat-transfer device is in thermal contact with the main inner surface 15 of the first radiator. The condenser 42 of the first auxiliary heat-transfer device is in thermal contact with the first auxiliary radiator 32. The condenser 42 of the second auxiliary heat-transfer device is in thermal contact with the second auxiliary radiator 36.

Figure 4:
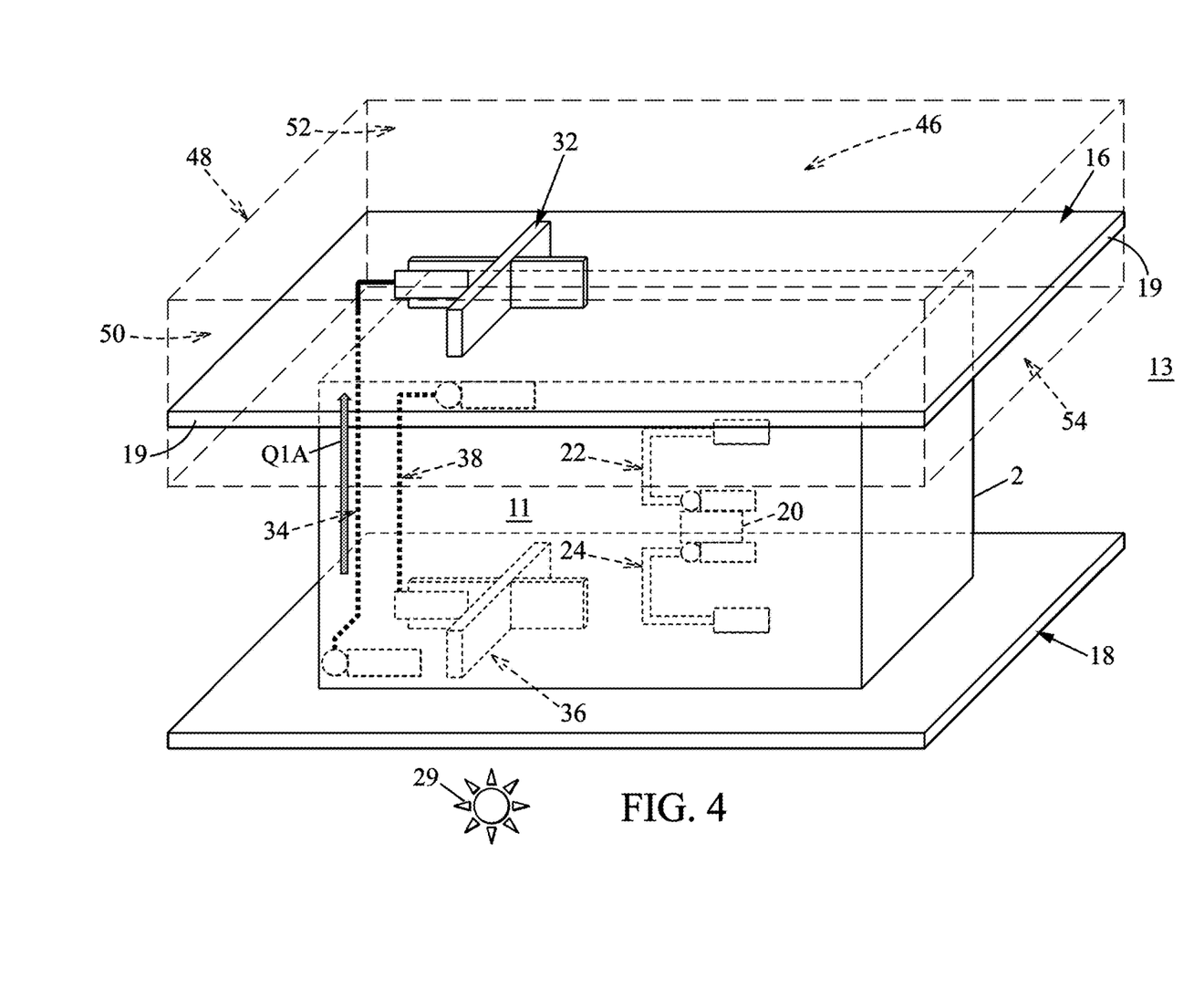
FIG. 4 is a perspective diagrammatical view of the spacecraft shown in FIG. 3, at the time of the winter solstice.

The first auxiliary radiator 32 and the first auxiliary heat-transfer device 34 make it possible to cool the second radiator 18 when the latter is exposed to solar radiation, i.e. during the winter solstice (WS). Indeed, as can be seen in FIG. 4, during the winter solstice, the second radiator 18 is exposed to solar radiation while the first auxiliary radiator 32 is located in the shade of the housing of the satellite. The difference in temperature between the second radiator 18 and the first auxiliary radiator 32 generates a transfer of a portion Q1A of heat from the second radiator 18 to the first auxiliary radiator 32 by the intermediary of the first auxiliary heat-transfer device 34. This portion Q1A of heat is evacuated to the outer space 13 by the first auxiliary radiator 32.

Figure 6:
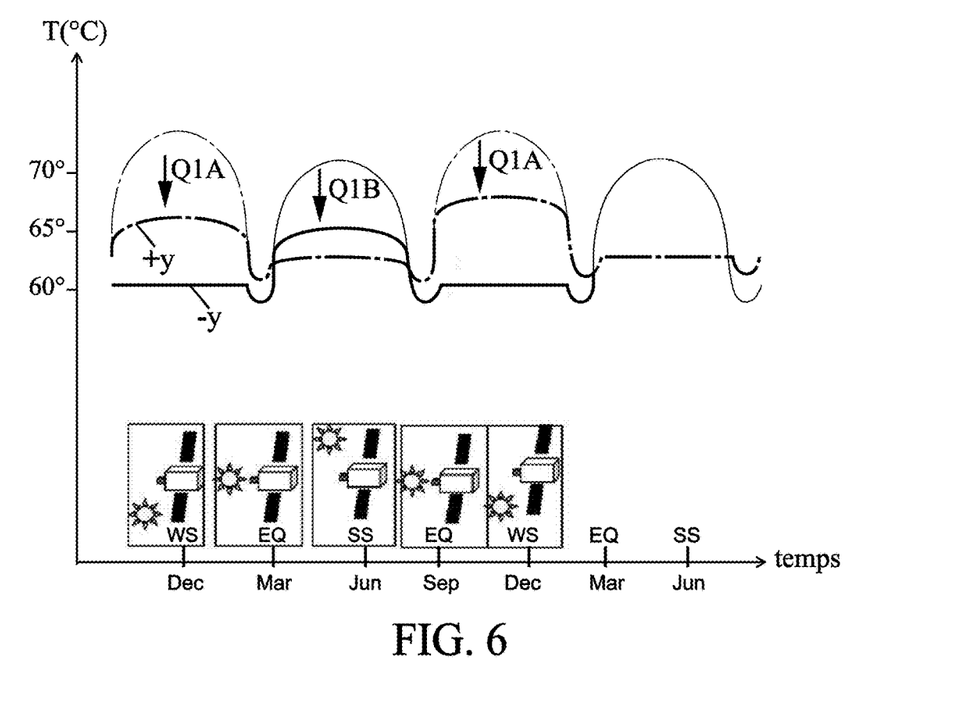
FIG. 6 is two curves that represent variations in temperature of the surfaces +Y and −Y of the spacecraft shown in FIG. 3, over the course of a year.

Consequently, as can be seen in FIG. 6, the temperature of the second surface (surface +Y) decreases during the winter solstice, reducing the difference in temperature between the first and second surfaces.

Figure 5:
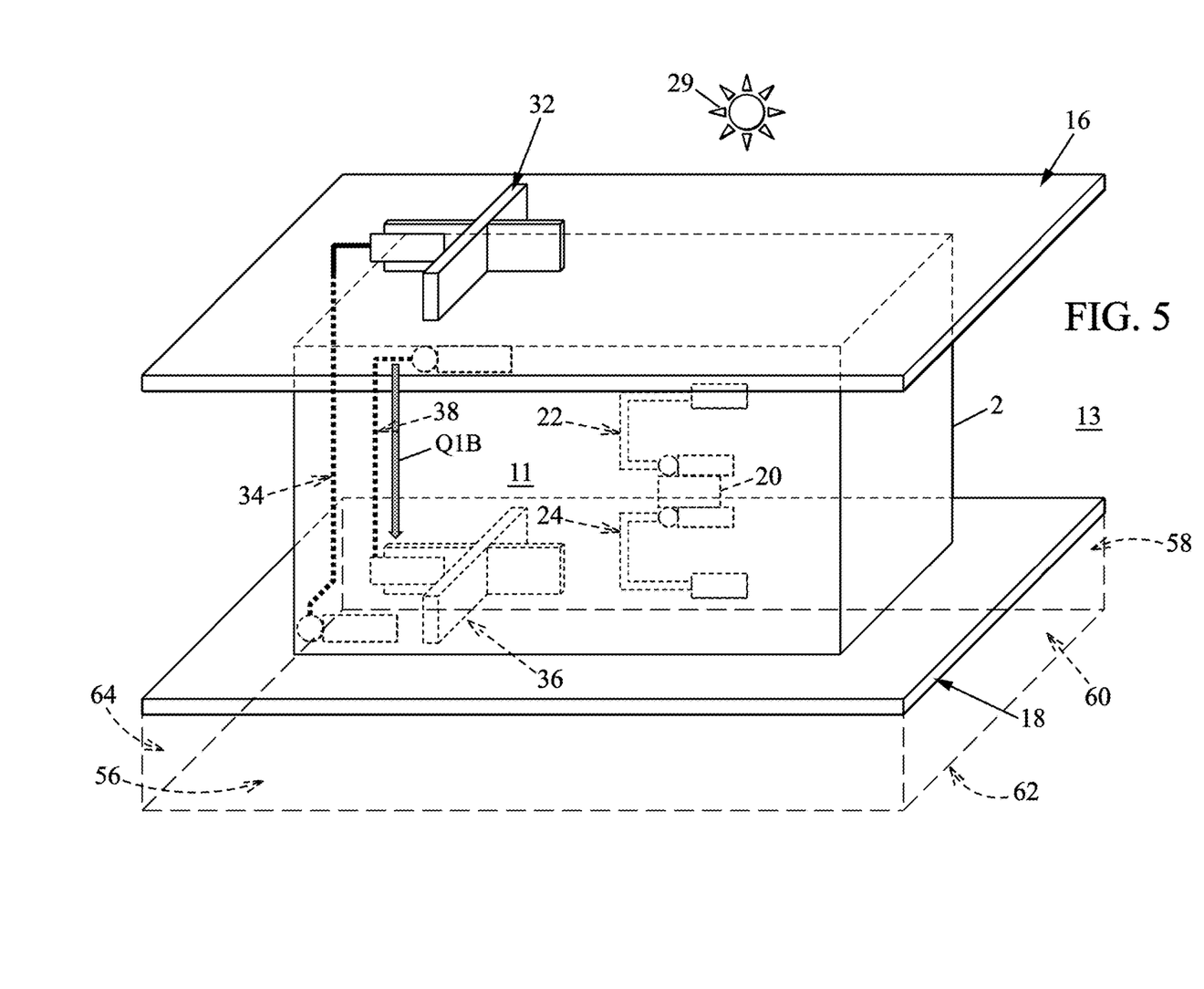
FIG. 5 is a perspective diagrammatical view of the spacecraft shown in FIG. 3, at the time of the summer solstice.

In the same way, the second auxiliary radiator 36 and the second auxiliary heat-transfer device 38 make it possible to cool the first radiator 16 when the latter is exposed to solar radiation, i.e. during the summer solstice (SS). As can be seen in FIG. 5, during the summer solstice, the first radiator 16 is exposed to solar radiation while the second auxiliary radiator 36 is located in the shade of the housing of the satellite. The difference in temperature between the first radiator 16 and the second auxiliary radiator 36 generates the transfer of a portion Q1B of heat of the first radiator 16 to the second auxiliary radiator 36 by the intermediary of the second auxiliary heat-transfer device 38. This portion Q1B of the heat is evacuated by the second auxiliary radiator 36 which is located on the shade side during the summer solstice.

As such, as can be seen in FIG. 6, the temperature of the first surface (surface −Y) decreases, during the summer solstice, reducing the difference in temperature between the first and second surfaces.

Figure 7:
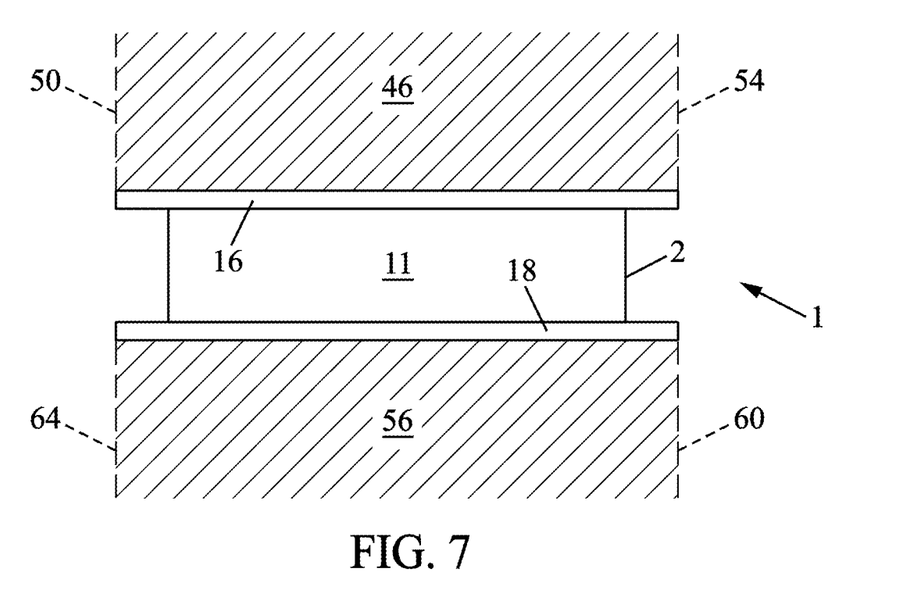
FIG. 7 is a simplified surface view of the spacecraft shown in FIGS. 3 to 5.

In order to allow for this heat transfer, the first 32 and second 36 auxiliary radiators are each arranged in the shade of the first radiator and respectively of the second radiator during a solstice. As such, the first auxiliary radiator 32 is arranged in the extension of the first radiator 16, according to a direction perpendicular to the first surface 7 of the first radiator 16. It extends in a first portion 46 of the outer space 13 which is located in the shade during the winter solstice. This first portion 46 is defined by the main outer surface 17 of the first radiator and by four planes 48, 50, 52, 54 each containing a side surface 19 of the first radiator, as shown diagrammatically in FIGS. 4 and 7.

In the same way, the second auxiliary radiator 36 is arranged in the extension of the second radiator 18, according to a direction perpendicular to the surface Y of the second radiator 18. It extends in a second portion 56 of the outer space 13 which is located in the shade during the summer solstice. This second portion 56 is defined by the main outer surface 23 of the second radiator and by four planes 58, 60, 62, 64 with each one containing a side surface 25 of the second radiator as shown diagrammatically in FIGS. 5 and 7.

The first 32 and the second 36 auxiliary radiators are, for example, arranged above solar panels 14 when the latter are folded in launch configuration. They have a small size according to the direction normal to the first 7 and second 8 surfaces as they must be able to be housed in the space under the nose cone of the launcher.

The first 32 and second 36 auxiliary radiators are preferentially thermally insulated from the first 16 and second 18 radiators that support them. This thermal isolation is, for example carried out by placing plastic washers in the legs for fastening the auxiliary radiators 32, 36 to the main radiators 16, 18.

Advantageously, this thermal insulation makes it possible to substantially increase the effectiveness of the auxiliary radiators 32, 36. Indeed, as can be seen in FIG. 1, the first radiator 16 and the second radiator 18 have, even when they are in the shade, a temperature close to 60° C. As the auxiliary radiators 32, 36 are insulated from the main radiators 16, 18, they have a temperature that is much lower than the temperature of the radiator fixed on the opposite surface of the housing 2 in such a way that they are capable of effectively absorbing a large quantity of heat coming from this radiator. As such, despite their small size, they make it possible to effectively evacuate the heat receive.

Figure 8:
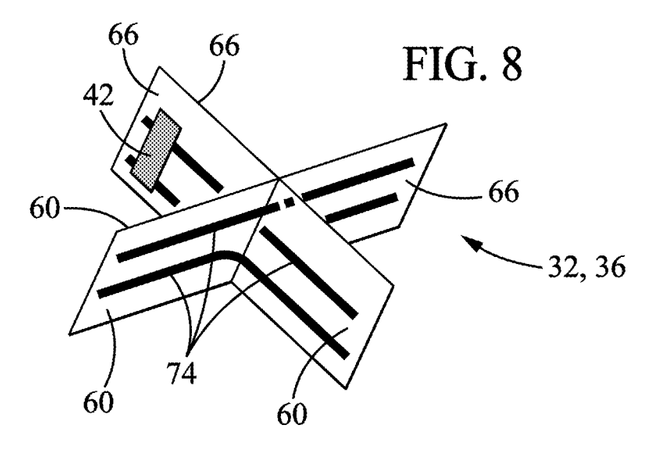
FIG. 8 is a perspective diagrammatical view of an auxiliary radiator according to the invention.
Figure 9:
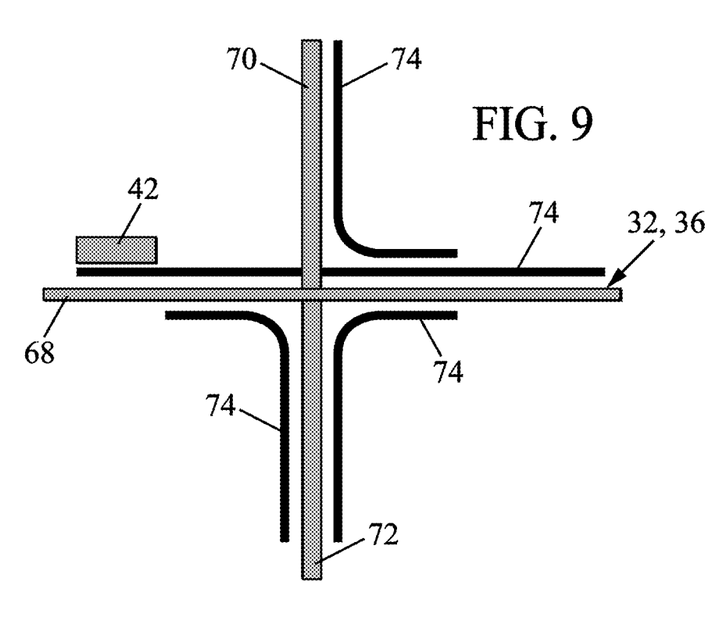
FIG. 9 is a diagrammatical surface view of the auxiliary radiator shown in FIG. 8.

According to an embodiment shown, the first auxiliary radiator 32 has the general shape of a cross. It is formed of a main rectangular plate 68 and of two secondary plates 70, 72 fixed on either side of the main plate 68.

Heat pipes 74 extend over the surfaces of the main plate 68 and over the surfaces of the secondary plates 70,72. The condenser 42 is fixed onto a surface of the main plate 68. It is in thermal contact with the heat pipes 74. The heat pipes 74 a such make it possible uniformly distribute over the entire auxiliary radiator 32, the heat coming from the condenser 42. This heat is then radiated to the outer space 13.

The second auxiliary radiator 36 is identical to the first auxiliary radiator and shall not be described a second time.

Alternatively, the first auxiliary radiator 32 can have the general shape of a star that has any number of branches such as for example three branches, five or six branches.

The main 68 and secondary 70, 72 plates are advantageously made of a flexible material, such as for example graphoil. In this case, the heat pipes 74 make it possible to rigidify the plates 68, 70, 72 that comprise the loop heat pipe 42.

Alternatively, the main 68 and secondary 70, 72 plates are made from aluminium.

According to an alternative not shown, the first auxiliary radiator 32 has the general shape of a cylindrical section open at each one of its ends.

According to another alternative not shown, the first auxiliary radiator 32 has the general shape of a parallelepiped open at each one of its ends.

In all of these embodiments, the first 32 and second 36 auxiliary radiators advantageously have main radiative surfaces 66 that extend in planes perpendicular to the first 7 and second 8 surfaces.

Figure 10:
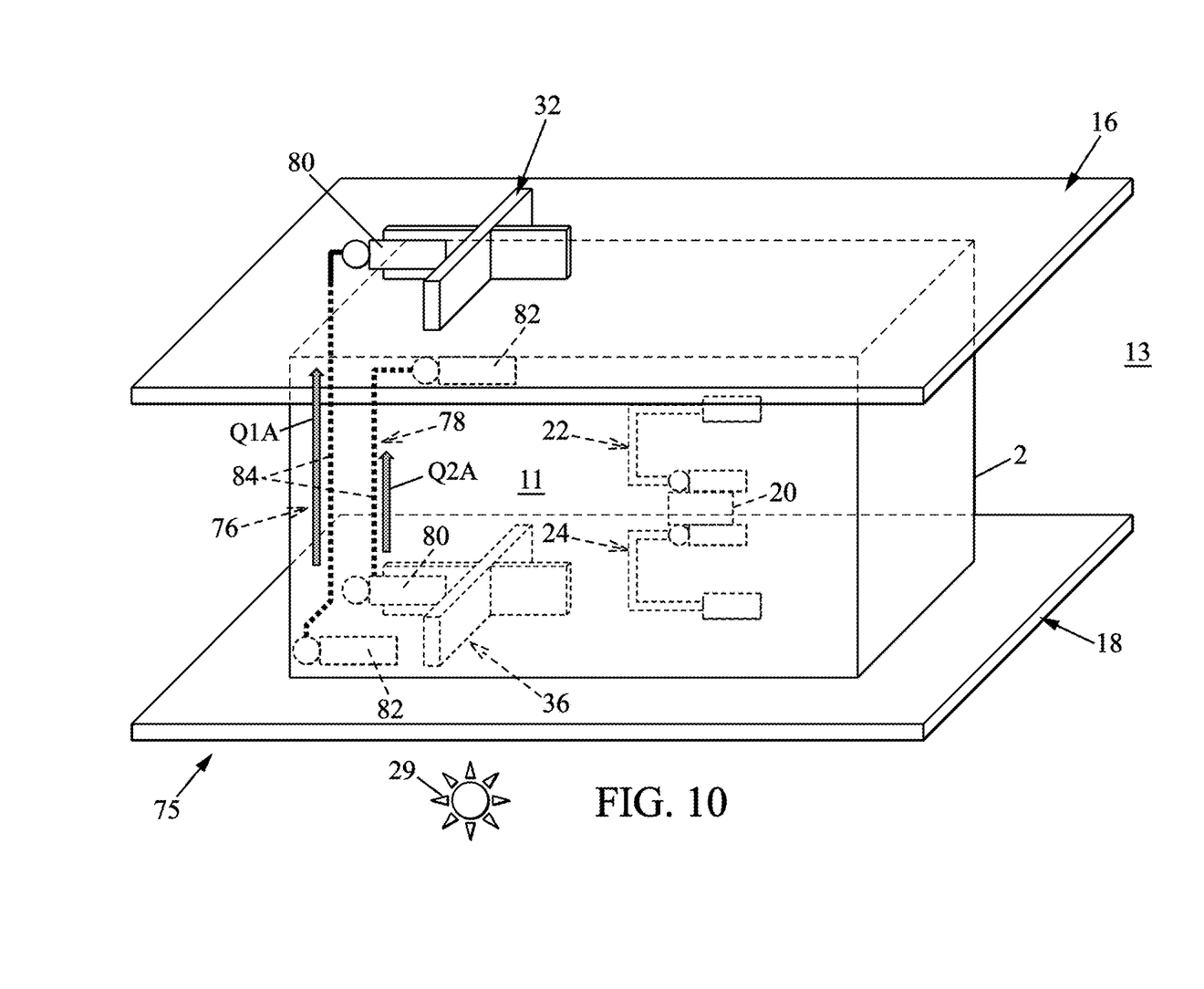
FIG. 10 is a perspective diagrammatical view of a second embodiment of the spacecraft according to the invention, during the winter solstice.
Figure 11:
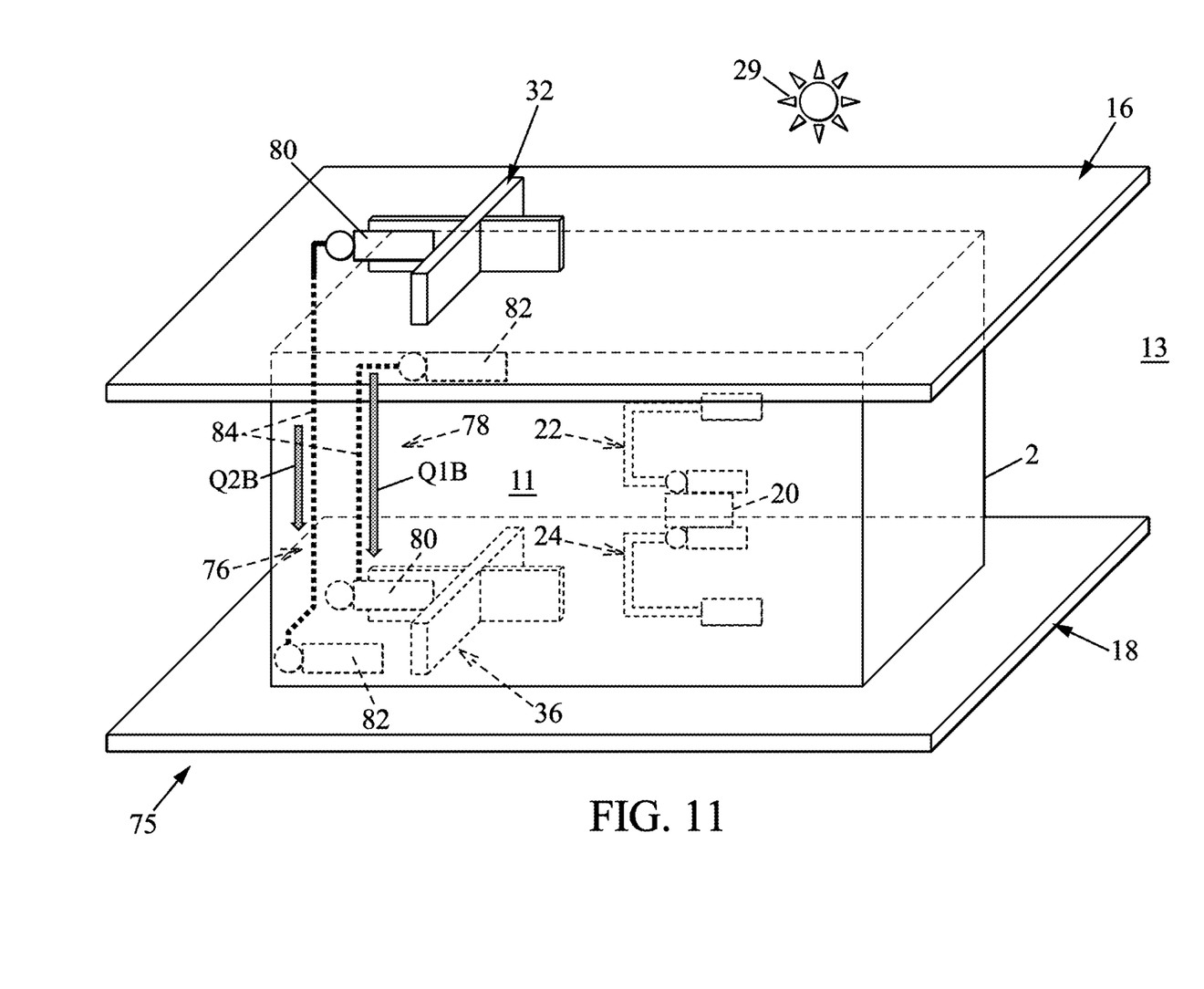
FIG. 11 is a perspective diagrammatical view of the spacecraft shown in FIG. 10, during the summer solstice.
Figure 12:
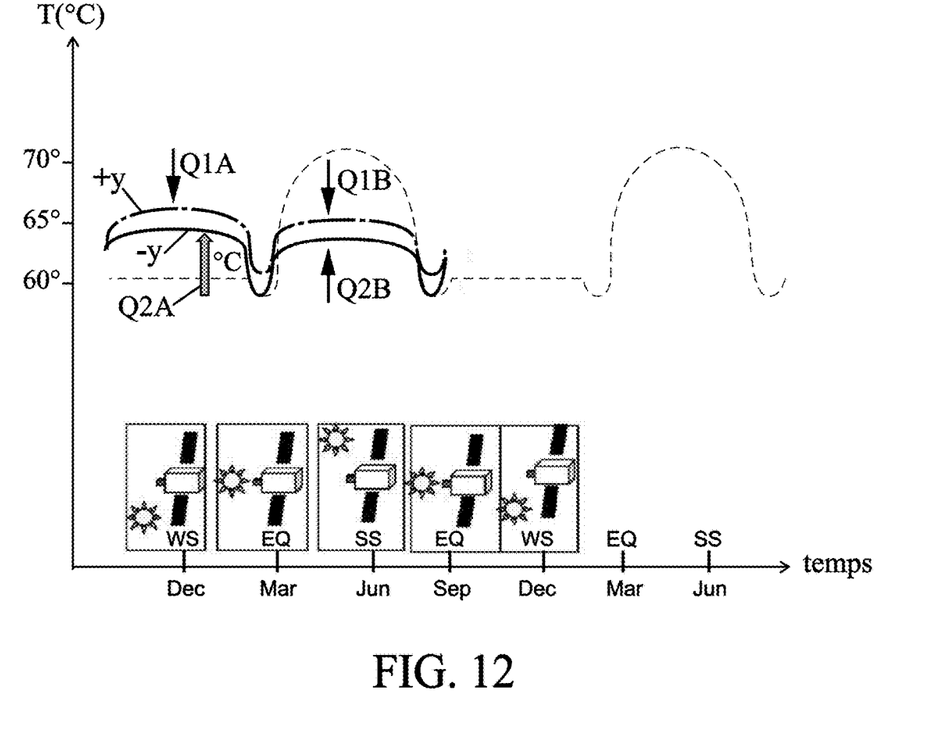
FIG. 12 is two curves that represent variations in temperature of the surfaces +Y and −Y of the spacecraft shown in FIG. 11 over the course of a year.

The second embodiment of the invention of the spacecraft 75, shown in the FIGS. 10 to 12, is similar to the first embodiment of the invention except for the fact that, in this second embodiment, the first 76 and the second 78 auxiliary heat-transfer devices are reversible or in other words are bidirectional.

The elements of the second embodiment that are identical or similar to the element of the first embodiment shall bear the same references and shall not be described a second time.

The first auxiliary heat-transfer device 76 of the second embodiment of the invention comprises a first heat exchanger 80 in thermal contact with the first auxiliary radiator 32, a second heat exchanger 82 in thermal contact with the inner surface of the second radiator 18, and with heat pipes 84 (HP) connecting the first heat exchanger 80 to the second heat exchanger 82. Reversible fluid loops, in particular capillary fluid loops wherein the fluid reservoir is integrated into the evaporator (Loop Heat Pipe) reversible can be used.

The first heat exchanger 80 and the second heat exchanger 82 are able to operate as a loop heat pipe or as a condenser. In the FIGS. 10 and 11, the first 80 and second 82 heat exchangers were represented by a circle and a rectangle.

The elements that comprise the second auxiliary heat-transfer device 78 are identical to the elements that comprise the first auxiliary heat-transfer device 76 and shall not be described in detail.

The first heat exchanger 80 of the second auxiliary heat-transfer device 78 is in thermal contact with the second auxiliary radiator 36. The second heat exchanger of the second auxiliary heat-transfer device is in thermal contact with the inner surface of the first radiator 16.

In reference to FIGS. 10 and 12, the first auxiliary radiator 32 and first auxiliary heat-transfer device 76 unit of the second embodiment of the invention, provide during the winter solstice the same function as the first auxiliary radiator 32 and first auxiliary heat-transfer device 34 unit of the first embodiment of the invention namely cooling the second radiator 18. This unit in addition provides, during the winter solstice, an additional function of heating the first radiator 16 by the transfer of a quantity of energy Q2A from the second auxiliary radiator 36 to the main inner surface 15 of the first radiator.

As can be seen in FIG. 12, this heating function makes it possible to further reduce the differences in temperature between the first 7 and second 8 surfaces during the winter solstice.

In the same way, in reference to FIGS. 11 and 12, the second auxiliary radiator 36 and the second auxiliary heat-transfer device 78 unit of the second embodiment of the invention, provides the same function as the second auxiliary radiator 36 and the second auxiliary heat-transfer device 78 unit of the first embodiment of the invention namely cooling the first radiator 16. This unit in addition provides a function of heating the second radiator 18 by transferring a quantity of energy Q2B from the first auxiliary radiator 32 to the main inner surface 21 of the second radiator.

As can be seen in FIG. 12, this heating function makes it possible to reduce the differences in temperatures between the first 7 and second 8 surfaces during the summer solstice.

Advantageously, in this second embodiment, the first and second auxiliary radiators are covered or painted with a coating with a high solar absorption coefficient and a high infrared emissivity, for example black paint so that they can absorb a maximum of heat when they are exposed to solar radiation in order to be able to heat as much as possible the main radiator located in the shade while still having good thermal rejection capacities when they are in the shade. Those skilled in the art (heating engineers in the space industry) know this type of material, which are in general a solar absorption coefficient that is much greater than 0.8, and an infrared emissivity much greater than 0.6 at the beginning of life.

In this description for reasons of simplification, the North surface was called first surface and the North radiator was called first radiator. However, the operation of the device according to the invention is symmetrical in such a way that the South surface can also be called first surface and the South radiator can also be called first radiator.

The invention claimed is:

1. Spacecraft (1, 75) comprising:
a housing (2) defining an inner space (11) and an outer space (13), the housing (2) having a first surface (7) and a second surface (8) opposite the first surface (7),
a first radiator (16) and a second radiator (18) supported by the first surface (7) and respectively the second surface (8), the first radiator (16) and the second radiator (18) each comprising a main inner surface (15, 21), a main outer surface (17, 23) opposite the main inner surface (15, 21) and side surfaces (19, 25), wherein
the spacecraft (1) further comprises a first auxiliary radiator (32) and a first auxiliary heat-transfer device (34, 76) thermally connecting said first auxiliary radiator (32) to the main inner surface (21) of the second radiator (18), the first auxiliary radiator (32) being arranged in a first portion (46) of the outer space (13), said first portion (46) being defined by the main outer surface (17) of the first radiator and by the first planes (48, 50, 52, 54) containing the side surfaces (19) of the first radiator.

2. Spacecraft (1, 75) according to claim 1, wherein said first auxiliary radiator (32) is thermally insulated from the first radiator (16).

3. Spacecraft (75) according to claim 1, which comprises a second auxiliary radiator (36) and a second auxiliary heat-transfer device (78) thermally connecting said second auxiliary radiator (36) to the main inner surface (15) of the first radiator (16); said second auxiliary radiator (36) being arranged in a second portion (56) of the outer space (13) defined by the main outer surface (23) of the second radiator (18) and by second planes (58, 60, 62, 64) containing the side surfaces (23) of the second radiator (18), and wherein the first auxiliary heat-transfer device (76) and the second auxiliary heat-transfer device (78) are reversible.

4. Spacecraft (75) according to claim 3, wherein the one at least from the first auxiliary radiator (32) and the second auxiliary radiator (36), is covered with a covering with a high solar absorption coefficient and a high infrared emissivity, for example black paint.

5. Spacecraft (1, 75) according to claim 3, wherein the one at least from the first auxiliary radiator (32) and the second auxiliary radiator (36) comprises at least one main radiative surface (66) which extends according to a direction perpendicular to the main outer surface (23) of the first radiator.

6. Spacecraft (1, 75) according to claim 1, wherein the first auxiliary radiator (32) comprises at least two plates (68, 70, 72) that cross.

7. Spacecraft (1, 75) according to claim 1, wherein the first auxiliary radiator (32) has the general shape of a cylindrical section open at each one of its ends.

8. Spacecraft (1, 75) according to claim 1, wherein the first auxiliary radiator (32) has the general shape of a parallelepiped open at each one of its ends.

9. Spacecraft (1) according to claim 1, wherein the first heat-transfer device (34) is not reversible.

10. Spacecraft (1, 75) according to claim 1, wherein the first auxiliary radiator (32) is made from a flexible material.

11. Spacecraft (1, 75) according to claim 10, wherein the first auxiliary radiator (32) is made from graphoil.

12. Spacecraft (75) according to claim 2, which comprises a second auxiliary radiator (36) and a second auxiliary heat-transfer device (78) thermally connecting said second auxiliary radiator (36) to the main inner surface (15) of the first radiator (16); said second auxiliary radiator (36) being arranged in a second portion (56) of the outer space (13) defined by the main outer surface (23) of the second radiator (18) and by second planes (58, 60, 62, 64) containing the side surfaces (23) of the second radiator (18), and wherein the first auxiliary heat-transfer device (76) and the second auxiliary heat-transfer device (78) are reversible.

13. Spacecraft (1, 75) according to claim 4, wherein the one at least from the first auxiliary radiator (32) and the second auxiliary radiator (36) comprises at least one main radiative surface (66) which extends according to a direction perpendicular to the main outer surface (23) of the first radiator.

14. Spacecraft (1, 75) according to claim 2, wherein the first auxiliary radiator (32) comprises at least two plates (68, 70, 72) that cross.

15. Spacecraft (1, 75) according to claim 3, wherein the first auxiliary radiator (32) comprises at least two plates (68, 70, 72) that cross.

16. Spacecraft (1, 75) according to claim 4, wherein the first auxiliary radiator (32) comprises at least two plates (68, 70, 72) that cross.

17. Spacecraft (1, 75) according to claim 5, wherein the first auxiliary radiator (32) comprises at least two plates (68, 70, 72) that cross.

18. Spacecraft (1, 75) according to claim 2, wherein the first auxiliary radiator (32) has the general shape of a cylindrical section open at each one of its ends.

19. Spacecraft (1, 75) according to claim 3, wherein the first auxiliary radiator (32) has the general shape of a cylindrical section open at each one of its ends.

20. Spacecraft (1, 75) according to claim 4, wherein the first auxiliary radiator (32) has the general shape of a cylindrical section open at each one of its ends.

\* \* \* \* \*